US005645647A

United States Patent [19]
Guzek et al.

[11] Patent Number: 5,645,647
[45] Date of Patent: Jul. 8, 1997

[54] MODIFIED POLYDEXTROSE AND PROCESS THEREFOR

[75] Inventors: Donald B. Guzek, Stonington; Russell J. Hausman, East Lyme, both of Conn.; Bharat K. Shah, Terre Haute, Ind.

[73] Assignee: Pfizer Inc., New York, N.Y.

[21] Appl. No.: 843,695

[22] Filed: Feb. 28, 1992

Related U.S. Application Data

[60] Division of Ser. No. 574,993, Aug. 29, 1990, which is a continuation-in-part of Ser. No. 302,153, Jan. 26, 1989, abandoned.

[51] Int. Cl.$^6$ .............. C13F 3/00; A23L 1/236; C08B 37/02; C07H 1/06
[52] U.S. Cl. .............. 127/30; 536/1.11; 536/112; 536/127; 426/548; 426/658
[58] Field of Search .............. 536/1.11, 112, 536/127; 426/548, 658

[56] References Cited

U.S. PATENT DOCUMENTS

| | | | |
|---|---|---|---|
| 3,766,165 | 10/1973 | Rennhard | 536/112 |
| 3,876,794 | 4/1975 | Rennhard | 426/152 |
| 4,024,334 | 5/1977 | Chandler et al. | 536/65 |
| 4,622,233 | 11/1986 | Torres | 426/548 |
| 4,814,195 | 3/1989 | Yokoyama et al. | 426/633 |
| 4,948,596 | 8/1990 | Bunick et al. | 426/3 |
| 4,956,458 | 9/1990 | Luo et al. | 536/112 |
| 5,066,511 | 11/1991 | Cherukuri et al. | 426/658 |
| 5,091,015 | 2/1992 | Bunick et al. | 127/30 |

FOREIGN PATENT DOCUMENTS

| | | | |
|---|---|---|---|
| 458748 | 11/1991 | European Pat. Off. | |
| 473333 | 3/1996 | European Pat. Off. | C08B 37/00 |

OTHER PUBLICATIONS

"Duolite Ion–Exchange Manual", Diamond Shamrock Chemical Company, 1969. Month N/A.
Technical product data on "Amberlite IRA–93", Rohm and Haas Co., 1981. Month N/A.
Technical product data on "XUS–40285", The Dow Chemical Company. Month N/A.
Kirk–Othmer, Encyclopedia of Chemical Technology, 3rd Ed., pp. 450–451. Month N/A.
Meilgaard, M. et al., Sensory Evaluation Techniques, 2nd Ed., pp. 173–175. Month N/A.
Pfizer Research Product Bulletin, Pfizer Central Research, Groton, CT (1981), p. 11.
Kunin, R., "Two Decades of Macroreticular Ion Exchange Resins", Amber–hi–lites, Rohm and Haas, Philadelphia, PA 19105.
Amerlite® Ion Exchange Resins, Fluid Process Chemicals and Apparatus, Technical Bulletin, Fluid Process Chemicals, Rohm and Haas, Philadelphia, PA 19105 (1983).

*Primary Examiner*—Glenn A. Caldarola
*Assistant Examiner*—Patricia L. Hailey
*Attorney, Agent, or Firm*—Peter C. Richardson; Gregg C. Benson

[57] ABSTRACT

An improved, water-soluble polydextrose containing 0.3 mol % or less of bound citric acid, a process therefor, and foods containing same.

30 Claims, No Drawings

MODIFIED POLYDEXTROSE AND PROCESS THEREFOR

CROSS-REFERENCE TO RELATED APPLICATION

This is a division, of application Ser. No. 07/574,993, filed Aug. 29, 1990, which is a continuation-in-part of application Ser. No. 07/302,153, filed Jan. 26, 1989 abandoned.

BACKGROUND OF THE INVENTION

This invention relates to an organoleptically improved, water-soluble polydextrose containing 0.3 mol % or less (e.g., 0.3 to 6.001 mol %) of bound citric acid, to a process therefor, and to foods containing same. The improved, water-soluble polydextrose of this invention is prepared by reducing the bound citric acid content of unimproved, water-soluble polydextrose, preferably by passing the unimproved, water-soluble polydextrose through one or more specified resins. Bound citric acid is also referred to herein as citric acid bound in the form of ester groups. These citrate esters are primarily dibasic, and so generally retain a measure of acidity. While the process of the invention coincidentally reduces free citric acid to less than 0.1 mol %, free citric acid can be added back where acidity is desired.

As used herein, the expression "water-soluble polydextrose" (also known as polyglucose or poly-D-glucose) specifically refers to the water-soluble polydextrose prepared by melting and heating dextrose (also known as glucose or D-glucose), preferably with about 5–15% by weight of sorbitol present, in the presence of a catalytic amount (about 0.5 to 3.0 mol %) of citric acid. Water-soluble polydextrose is an item of commerce which, as an approved food additive, is defined in the Food and Drug Section of the Code of Federal Regulations (21C.F.R. 172.841). In its unimproved form, it is also described by Rennhard, U.S. Pat. No. 3,766,165, which claims, inter alia, a "[w]ater-soluble highly branched poly[dextrose] wherein the linkage of 1→6 predominates, having number average molecular weight between about 1,500 and 18,000 and containing from about 0.5 to 5 mole percent of [citric] acid ester groups . . . ", i.e., water-soluble polydextrose characterized by its content of from about 0.5 to 5 mol % of bound citric acid; and by Rennhard, U.S. Pat. No. 3,876,794, which claims various foods containing same. According to Rennhard, water-soluble polydextrose is preferably prepared using 0.5–5 mol percent of citric acid as catalyst. However, since Rennhard's use of about 6 mol percent of citric acid produced more than two thirds undesired insoluble polydextrose, we prefer use of citric acid at a level in the range of about 0.5 to 3 mol percent. The most preferred range is about 0.7 to 1.3 mol percent, approximating the 1% by weight noted in the C.F.R., cited above. Rennhard also specified optional use of about 5–20% (preferably 8–12%) by weight of sorbitol in the polymerization. The narrower range approximates the 10% by weight of sorbitol also noted in the C.F.R., cited above.

However, as variously noted in the art [Torres in U.S. Pat. No. 4,622,233; Goff et al., J. Food Science, vol. 49, pp. 306–307 (1984); Lim et al., J. Food 30 Science, vol. 54, pp. 625–628 (1989)] Rennhard's polydextrose possesses a slight bitter taste which limits the breadth of its use in foods.

Torres believed that the bitter taste of Rennhard's polydextrose was due to the presence of anhydroglucose. While that compound has not been ruled out as one of the factors in the bitter taste, we have now surprisingly found that bound citric acid (i.e. the 0.5 to 5% mol % of citric acid ester groups in Rennhard's polydextrose) is the most important factor in causing said bitter taste.

Rennhard generally suggested the use of ion exchange as a method of reducing the acidity of his polydextrose; e.g., at column 6, lines 48–50 of U.S. Pat. No. 3,766,165. Three types of basic ion exchange resins are available for this purpose, viz: Types I and II strong base anion resins, and weak base anion resins. Type I resins, which contain quaternized amine functional groups are the most strongly basic and have the greatest affinity for weak acids such as carboxylic acids. However, not all operating conditions for use of Type I resins are effective in preparing the improved polydextrose of this invention. Use of a Type I strongly basic exchange resin outside of the conditions disclosed by this invention leads to polydextrose with inferior taste.

Weakly basic ion exchange resins are not ordinarily recommended for the removal of carboxylic acid. Thus, it was a most unexpected result when it was found that such resin also greatly reduced the level of bound citric acid, while at the same time greatly decreasing or virtually eliminating the objectionable bitter taste of the polydextrose.

Rennhard also suggested dialysis as a method of reducing the acidity of polydextrose. However, this method is well known to selectively remove low molecular weight compounds which diffuse through a membrane where higher molecular weight solutes do not. We now know that the citrate ester compounds (bound citric acid) which are primarily responsible for the bitterness in unimproved polydextrose span a wide range of molecular weights comparable to the molecular weight range of polydextrose itself. Thus, dialysis would be unsuitable for the removal of such compounds.

SUMMARY OF THE INVENTION

The present invention is directed to an improved form of the water-soluble polydextrose defined above. This improved form is characterized by its content of 0.3 mol percent or less of citric acid bound in the form of ester groups. The polydextrose optionally contains about 5 to 15% by weight of sorbitol residues. An improved polydextrose according to this invention contains 0.3 to 0.001 mol percent, especially 0.2 to 0.001 mol percent, of bound citric acid. However, for many applications, a bound citric acid level of 0.3 to 0.01 is suitable. In its still more preferred form, the improved polydextrose of this invention contains about 8 to 12% by weight of sorbitol residues. As noted above, the present process coincidentally reduces the level of unbound or so-called free citric acid to less than 0.1 mol percent or even to less than 0.01 mol percent. However, this is not a critical feature of the present invention, and there will be circumstances where it will be desirable to add back the citric acid, for its acidity and/or for its lemony taste.

The present improved form of water-soluble polydextrose, as defined above, is also characterized by its mode of preparation, viz., by the sequential steps of (a) melting dextrose at a temperature below its decomposition point in the presence of from about 0.5 to 3 mol percent (preferably about 0.7 to 1.3 mol percent) of citric acid (preferably in the presence of 5–15% by weight of sorbitol, more preferably 8–12% by weight of sorbitol); and (b) reducing the content of citric acid bound in the form of ester groups in the resulting unimproved polydextrose product to 0.3 mol percent or less, preferably by passing a concentrated aqueous solution of the unimproved polydextrose through one or more of an adsorbent resin, a weakly basic ion exchange resin, a Type I strongly basic ion exchange resin, a Type II strongly basic ion exchange resin, or a mixed bed resin comprising a basic ion exchange resin and a cation exchange resin.

The present invention is also directed to foodstuffs comprising said improved polydextrose, particularly those further comprising one or more sweetening agents selected from the group consisting of alitame, aspartame, acesulfame and saccharin, most particularly to those further comprising alitame or aspartame; and to dry low calorie sweetener compositions comprising at least 50% by weight of said improved polydextrose and one or more sweetening agents selected from the group consisting of alitame, aspartame, acesulfame and saccharin, particularly one with alitame.

Furthermore, the present invention is directed to a process for preparing said improved polydextrose which comprises passing an aqueous solution of conventional, unimproved polydextrose through one or more of (1) an adsorbent resin, (2) a weakly basic ion exchange resin, (3) a Type I strongly basic ion exchange resin, (4) a Type II strongly basic ion exchange resin and (5) a mixed bed resin comprising a weakly basic ion exchange resin or a Type I strongly basic ion exchange resin or a Type II strongly basic ion exchange resin and a cation exchange resin, and recovering said polydextrose as an aqueous solution or in solid form substantially free of water. As an optional step, the aqueous solution of polydextrose can be passed through a cation exchange resin after passage through any of the resins described above.

In general, unimproved water-soluble polydextrose is prepared by melting dextrose containing about 0.5 to 3 mol percent of citric acid at a temperature below its decomposition point, maintaining said molten mixture at a temperature of 140° to 295° C. and at reduced pressure in the substantial absence of water until substantial polymerization occurs and simultaneously removing water formed during said polymerization.

Preferably, from about 5 to 15% of sorbitol by weight is incorporated into the mixture prior to melting and polymerization; even more preferred is to incorporate sorbitol in the range of about 8 to 12% by weight. The reduced pressure is preferably less than 300 mm of mercury. The preferred level of citric acid in the polymerization is in the range of about 0.7 to 1.3 mol percent, nominally about 1% by weight per the C.F.R. cited above.

A preferred ion exchange resin is a weakly basic ion exchange resin, particularly one containing tertiary dimethylamine functionality. The most preferred ion exchange resin of this type is Amberlite IRA-93® manufactured by Rohm and Haas.

Another preferred ion exchange resin is a Type I strongly basic ion exchange resin with quaternary trimethylamine functionality. The most preferred ion exchange resin of this type is Amberlite IRA 900 manufactured by Rohm and Haas.

Yet another preferred ion exchange resin is a Type II strongly basic ion exchange resin with quaternary dimethylethanolamine functionality. The most preferred ion exchange resin of this type is Dowex 22® manufactured by Dow.

A preferred cation exchange resin for use in the mixed bed resins described hereinabove is a macroreticular resin containing sulfonic acid functionality on a styrene-divinylbenzene matrix.

Preferred cation exchange resins of this type are Amberlite 200 manufactured by Rohm and Haas and Dowex 88 manufactured by Dow.

Preferred ion exchange resins for use in the mixed bed resins described hereinabove are the preferred and most preferred weakly basic ion exchange resins, Type I strongly basic ion exchange resins and Type II strongly basic ion exchange resins also described hereinabove. The most preferred mixed bed resin comprises a mixture of about 2:1 v/v of one of the most preferred ion exchange resins hereinabove described and either Amberlite 200 or Dowex 88.

When an adsorption resin is used, the preferred resin is one which contains amine functionality on a styrene-divinylbenzene matrix, for example Dow's XU-40285.00. When a weakly basic ion exchange resin is used, it is preferable to pass the resulting solution through a Type II strongly basic ion exchange resin or a mixed bed resin as described above. Preferred resins for such dual passage are those described immediately above. Further, after passage through any of such resins, the resulting solution can be passed through a cation exchange resin. Preferred cation exchange resins are given above.

In practicing this invention with an adsorbent resin, it is preferable to pass an aqueous solution containing about 10–70% by weight of the unimproved polydextrose at a flow rate of about 0.05–3 bed volumes per hour and a temperature of about 10°–80° C. through said adsorbent resin. When a weakly basic ion exchange resin is used in practicing this invention, it is preferable to pass an aqueous solution containing about 10–70% by weight of the unimproved polydextrose at a flow rate of about 0.05–8 bed volumes per hour and a temperature of about 10°–70° C. through said weakly basic ion exchange resin.

In practicing this invention with a Type I strongly basic ion exchange resin, it is especially important to control the conditions under which the aqueous solution containing unimproved polydextrose is passed through said resin. Thus, for Type I strongly basic ion exchange resins, it is preferable to pass an aqueous solution containing about 10–70% by weight of the unimproved polydextrose at a flow rate of about 0.1–12 bed volumes per hour and a temperature of about 10–50° C. through said Type I strongly basic ion exchange resin.

In practicing this invention with a Type II strongly basic ion exchange resin, it is preferable to pass through said resin an aqueous solution containing about 10–70% by weight of the unimproved polydextrose at a flow rate of about 0.05–8 bed volumes per hour and a temperature of about 10° C. to about the upper limit of temperature which is permissible for use of said Type II resin. Such upper limit of temperature is dictated by factors such as the recommendation of the manufacturer of said Type II resin and the temperature above which the resin ceases to function. The preferred Type II resins hereinabove described have, as an upper temperature limit, 40° C.

When a mixed bed resin is used in the practice of this invention, it is preferable to pass through said mixed resin an aqueous solution containing about 10–70% by weight of the unimproved polydextrose at a flow rate and temperature which is preferable for the basic ion exchange resin used in said mixed bed resin. Preferred flow rate and temperature ranges for the basic ion exchange resins are described above. However, when using such mixed bed resins, a lower flow rate within the ranges given above is preferred.

When employing a cation exchange resin following passage of the solution through any of said resins, it is preferable to pass such a solution containing about 10–70% by weight of the polydextrose at a flow rate of about 1–20 bed volumes per hour and a temperature of about 10°–80° C. through said cation exchange resin. When a combination of such resins are used in sequence, it is preferable to employ the preferred conditions specified above for each such resin in turn.

As those skilled in the art are aware, the effectiveness of the particular resin or resins employed in the practice of this invention will vary depending upon the capacity of the resin or resins employed. Therefore, to optimize yield of desired improved polydextrose, adjustment of the ratio of unimproved polydextrose to resin, as well as the flow rate and temperature, will be necessary and all such adjustments are within the skill of those who practice in the art enabled by this disclosure. For example, it may be necessary to employ a higher flow rate within the flow rate ranges described above when practicing the process at a higher temperature within the temperature ranges described above. However, it is to be noted that any adjustment to the conditions for use of Type I strongly basic ion exchange resins must be made carefully since the conditions under which use of such resins will yield the improved polydextrose of this invention are stringent and are believed to be within the preferable ranges described hereinabove.

In the preferred method of isolating the present improved polydextrose in solid form, water is removed using film evaporation.

As used here and elsewhere herein, "bound citric acid" refers to citric acid which is released when polydextrose is subjected to base catalyzed hydrolysis conditions. The "mol % of citric acid" used as catalyst in the polymerization is calculated from the weight % of citric acid as follows:

$$\frac{\frac{\text{wt citric acid}}{192} \times 100}{\frac{\text{wt citric acid}}{192} + \frac{\text{wt glucose}}{180*} + \frac{\text{wt sorbitol}}{182}}$$

*198 if the monohydrate is used.

In its preferred variation, the dilute polydextrose solutions which are collected at the beginning and end of the run are held apart from the more concentrated solution collected during normal operation. The dilute solutions are then used in the makeup of the next batch of concentrated solution for resin treatment.

In the unimproved polydextrose product directly formed by heating and melting dextrose in the presence of citric acid, the total wt % of bound and unbound citric acid will be increased in the polymerization by the fact that water is lost in this process. However, the total mol % of bound and unbound citric acid will stay the same since there is no net loss of glucose, sorbitol or citric acid residues. Thus, the mol % of unbound and bound citric acid in unimproved polydextrose is readily calculated from the proportions by weight of each of free and bound citric acid to total citric acid, factored by the mol % of citric acid originally introduced into the polymerization. However, when the polydextrose is modified and improved according to the present process, undetermined amounts of bound and unbound citric acid, as well as glucose and sorbitol residues are removed, such that as a practical matter, the mol % of either bound or unbound citric acid is best calculated by simply multiplying the weight % by 162/192, the ratio of the molecular weights of a glucose unit (glucose-H$_2$O) and of citric acid. For the sake of conformity and ease of comparison with Rennhard's U.S. patents cited above, such mol % values for free and bound citric acid are used in the present claims.

DETAILED DESCRIPTION OF THE INVENTION

The present invention is readily carried out.Ced above, preferably by a continuous process such as that exemplified below. The resulting unimproved water-soluble polydextrose product, which corresponds to that of Rennhard, is then solubilized in water, preferably at high concentration, e.g., in the range of about 50–70% w/w, and at somewhat elevated temperature (e.g., about 30°–70° C.). Preferably at the same elevated temperature and, if desired, at somewhat elevated pressure (e.g., up to about 5 atmospheres), the resultant solution is passed through one or more of a column of weakly basic ion exchange resin, of Type I strongly basic ion exchange resin, of Type II strongly basic ion exchange resin, of an adsorbent resin or of a mixed bed resin comprising a basic ion exchange resin and a cation exchange resin. Further, following passage through any of said resins or combinations thereof, the solution can be passed through a cation exchange resin. In any case, the present improved polydextrose, now containing less than 0.1 mol % of free citric acid and 0.3 mol % or less of bound citric acid, is collected from the column as an aqueous solution, which in many applications can be used directly without further isolation. Alternatively, the improved polydextrose is recovered from the solution by conventional means, e.g., by removing the water under vacuum and/or the addition of a non-solvent such as alcohol. A preferred method is to recover the polydextrose as a melt in a thin film evaporator and to solidify the melt by cooling.

Free and bound citric acid are determined by HPLC. To determine total citric acid (free and that bound as ester), an alkaline solution of polydextrose is heated to hydrolyze citric acid esters, and the hydrolyzate is analyzed for citric acid. In Method A, described below, free citric acid is also determined by direct analysis of an unhydrolyzed solution of polydextrose. Bound citric acid is then calculated as total citric acid less free citric acid. Method B, also described below, is more sensitive than Method A but determines total citric acid only. Free citric acid can not be independently determined because citric acid esters are partially hydrolyzed under the conditions of HPLC analysis employed in Method B. This is unimportant for analysis of highly purified polydextrose, however, since levels of free citric acid are extremely low.

HPLC Method A

To determine free citric acid, 0.050 ml of a 100 mg/ml solution of polydextrose is injected at the top of a BioRad Cation H guard column (cat. no. 125–0129) which is in series with a BioRad Aminex HPX-87H analytical column (cat no. 02833). The mobile phase is 0.036 $\underline{N}$ H$_2$SO$_4$, the flow rate is 0.6 ml/minute, and the temperature is ambient. Citric acid is detected by its ultraviolet absorption at 210 nm, and is measured against a standard citric acid solution (0.8 mg/ml) chromatographed in like manner. The citric acid chromatographic peak, which appears at a retention time of about 8 minutes, is sometimes superimposed on the trailing edge of an unidentified larger peak. When necessary, it is resolved from this peak by tangential skimming, a well-known method which is described, for example, on page 13 of chapter 6 of the Spectra-Physics SP4270 Operator's Manual, copyright 1982. Total citric acid is determined by adding 2.0 ml of 2.5 $\underline{N}$ NaOH to 5 ml of a 100 mg/ml solution of polydextrose, heating the resulting basic solution at 70° C. for 2 hours, cooling and acidifying the hydrolysate with 2.0 ml of 2.88 $\underline{N}$ H$_2$SO$_4$, diluting the hydrolysate to 10 ml with mobile phase, and analyzing for citric acid by HPLC by the same method. Bound citric acid is calculated as total citric acid less free citric acid.

HPLC Method B

The HPLC system includes an injector with a 10-microliter sample loop, an Ionpac AS5A 5-micron separator column (Dionex cat. no. 037131), and a conductivity detector equipped with a chemical suppression system (Dionex cat. no. 038019 or equivalent). The mobile phase is carbonate-free 0.048 $\underline{M}$ NaOH, at a flow rate of 1.0 ml/minute. Total citric acid is determined by diluting a 250 mg sample of polydextrose, or equivalent quantity of solution, to 25 ml with mobile phase, heating for 60 minutes at 70° C., cooling and analyzing the resulting solution by HPLC against a standard citric acid solution (0.02 mg/ml). The citric acid chromatographic peak, which appears at a retention time of about 5 minutes, is measured by conductivity (Dinoex cat. no. 42039) with chemical eluent suppression using an anion micromembrane suppressor (Dionex cat. no. 30819).

Average molecular weight ($M_n$) values were which appears at a retention time of about 5 minutes, is measured by conductivity (Dionex cat. no. 42039) with chemical eluent suppression using an anion micromembrane suppressor (Dionex cat. no. 30819).

Average molecular weight ($M_n$) values were determined by using methods earlier described by Rennhard in the patents cited above. See also Isbell, J. Res. Natl. Bur. Stds. 24, 241 (1940).

The present improved polydextrose is incorporated into foods according to methods previously disclosed by Rennhard and Torres in the three U.S. patents cited above, and as further exemplified below.

The improved taste of food products prepared with present modified polydextrose is reflected in the so-called hedonic test, a common method of measuring food acceptance. The test employs a taste panel, generally 15–20 in number. It is a straight acceptance test, and does not necessarily require an experienced panel. However, in the present evaluations an experienced panel was used. Panelists were given coded samples to rate for acceptance by checking a point on the so-called Hedonic scale as shown in Table I. At the same time the panelists were given a space to provide optional comments. In a special form of the hedonic test, generally used in the present studies, pairs of coded food samples, one containing conventional, unimproved polydextrose and one containing present modified, improved polydextrose were compared side by side, without the panel knowing which sample contained the improved polydextrose. The hedonic score was calculated as the numerical average of the individual scores assigned by the individual panel members.

TABLE I

Hedonic Scale for Evaluating Foods

| Scale | |
|---|---|
| 9 | \_Like Extremely |
| 8 | \_Like Very Much |
| 7 | \_Like Moderately |
| 6 | \_Like Slightly |
| 5 | \_Neither Like Nor Dislike |
| 4 | \_Dislike Slightly |
| 3 | \_Dislike Moderately |
| 2 | \_Dislike Very Much |
| 1 | \_Dislike Extremely |

For evaluation of bulk lots of polydextrose, two different methods were used. In one such method, hereinafter referred to as Test Method I, unflavored hard candy prepared from the polydextrose to be tested was evaluated by a taste panel as described above. Hard candy for evaluation was made by heating a mixture of polydextrose 50% in water (49.48 wt %) with Lycasin in water (49.49 wt %) to 157°–160° C. in an oil bath at 180° C., cooling to 140° C. and adding citric acid (0.80 wt %) and alitame 10% triturate in mannitol (0.23 wt %) with thorough stirring. The mass was transferred to a lightly oiled marble slab, cooled to 80° C., and stamped into hard candy. The hedonic value which was determined for the resulting hard candies was the hedonic value assigned to the bulk polydextrose. Another test method, hereinafter referred to as Test Method II, involves the evaluation, by a trained food technologist, of an aqueous solution containing about 50% polydextrose. Usually, for Test Method II, the polydextrose solution resulting from the purification process was evaluated directly but, in some cases, the polydextrose was recovered from the solution and a sample thereof was redissolved in water for evaluation. As a control, unimproved polydextrose was evaluated in aqueous solution at the same concentration. As with Test Method I, the Hedonic scale as shown in Table I was used.

The present invention is illustrated by the following examples. However, it should be understood that the invention is not limited to the specific details of these examples.

EXAMPLE 1

Unimproved Polydextrose

Dextrose monohydrate, sorbitol and citric acid were continuously and intimately mixed in the following proportions by weight: dextrose monohydrate/sorbitol 89.8:10.2 to 90.3:9.7, with citric acid at a level of 0.9 to 1.0% of the total weight. This blend was continuously fed to a reactor operating at an average temperature of 137° C. and at a pressure in the range of 4.1 to 4.6 psia. The feed rate was adjusted to achieve at least 96% polymerization as determined by analysis of residual glucose by the method described on page 59 of the Second Supplement to the Third Edition of the Food Chemicals Codex, (National Academy Press, copyright 1986). The following data were obtained from three representative batches of the polydextrose product: by HPLC Method A, free citric acid 0.35, 0.47 and 0.37 wt %; and citric acid bound as ester 0.65, 0.54 and 0.60 wt %, respectively. Under these conditions, the 0.9 to 1.0 wt % of citric acid used as catalyst is calculated to be 0.92 to 1.02 mol %, 0.97 mol % on average. The total of free and bound citric acid in the polydextrose product will likewise be 0.97 mol %. From the ratios of free and bound citric acid determined analytically, one calculates for the above three representative batches of polydextrose: free citric acid 0.34, 0.45 and 0.37 mol %; bound citric acid 0.63, 0.52 and 0.60 mol %, respectively (vide supra).

The hedonic scores for the same three batches, determined according to Test Method I, were 3.7, 4.8 and 5.1, respectively.

EXAMPLE 2

Improved Polydextrose By Weakly Basic Ion Exchange Treatment

A bulk lot of polydextrose, prepared as described in Example 1 (having a hedonic score of 5.4, and $M_n$, number average molecular weight, 4700), was dissolved in water to make a 845 lbs. of a 60% w/w solution. The solution was passed through a freshly prepared column of 0.59 cubic feet of Rohm & Haas Amberlite IRA 93 anion resin. IRA 93® is a macroreticular resin containing tertiary amine functionality on a styrene-divinylbenzene matrix. The solution was maintained at 50 to 55°C. Water initially displaced from the column was discarded and, over a 7.5 hour period, 735 lbs. of purified polydextrose solution was collected. The pass was discontinued, and, in order to make polymer recovery nearly quantitative, the residual polydextrose was eluted from the column with about 2 bed volumes of water. The resulting diluted eluant was used in the make-up of the next batch of 60% w/w solution. The resin was regenerated using the manufacturer's recommended procedure. In a like fashion the main solution was passed again through the resin column. The polydextrose was reisolated by evaporating the water in a thin film evaporator and solidifying the melt in trays. This process was repeated twice more and the three batches blended together. A representative sample of the blend was analyzed by HPLC Method A: citric acid 0.001 wt %, citric acid bound as ester 0.076 wt %. By using the factor of 162/192, free citric acid is calculated to be 0.001 mol %, and bound citric acid is calculated as 0.064 mol %. The hedonic score, determined according to Test Method I, was 6.9, and $M_n$ was 4900.

Ten batches total were prepared in like manner. These showed citric acid levels ranging from less than 0.001 to 0.006 wt %, bound citric acid levels ranging from 0.061 to 0.129 wt % (both by HPLC Method A), and hedonic scores, determined by Test Method I, ranging from 6.42 to 6.94 (average, 6.71).

A further batch was prepared using only a single pass on the same ion exchange resin. It showed free citric acid 0.004 wt %; bound citric acid 0.224 wt % (both by HPLC Method A); and a hedonic score, determined by Test Method I, of 6.46; and $M_n$ 4500.

EXAMPLE 3

Improved Polydextrose By Adsorption Resin Treatment

A 60% w/w solution of unimproved polydextrose ($M_n$ 4700, hedonic score 5.4) was passed through a fresh column of Dow XU-40285.00 adsorbent resin. XU-40285.00 is a dimethyl amine functionalized chloromethylated macroporous copolymer of styrene and divinylbenzene. 50 cc of resin maintained at 50° C. was used to prepare 450 cc of solution in 3.7 hours. The solution was diluted to about 20% and filtered. The water was removed under vacuum at 50° C. to produce a dry solid. The product showed $M_n$ 4400 and a hedonic score of 6.9.

When the above described process was repeated it was found that a ratio of about 350 lbs unimproved polydextrose per cubic foot of resin would not yield improved polydextrose within the scope of this invention. Therefore, this Example was repeated as described immediately below. A bulk lot of polydextrose, prepared as described in Example 1, was dissolved in water to make 450 grams of a 60 % w/w solution. This solution was passed through a freshly-prepared column of 75.0 cubic centimeters of Dow XU-40285.00 adsorbent resin at about 50° C. The water initially displaced from the column was discarded. Over a period of 8.0 hours, 380.7 grams of improved polydextrose solution was collected. The initial 363.3 grams of this solution was evaporated to a syrupy liquid.

By HPLC analysis of the solution using HPLC Method B, the improved polydextrose contained 0.32 wt % total citric acid. The hedonic score, determined for the solution by Test Method I, was 6.0. A control solution containing the same concentration of unimproved polydextrose had a hedonic score of 4.0.

EXAMPLE 4

Improved Polydextrose By Type II Strongly Basic Ion Exchange Treatment

A bulk lot of polydextrose, prepared as described in Example 1, was dissolved in water to make 1700 grams of a 55 % w/w solution. This solution was passed through a freshly-prepared column of 150 cubic centimeters of Dowex 22® anion exchange resin at about 35°–37° C. and a flow rate of about 1.6 bed volumes per hour. Dowex 22® is a macroreticular resin containing quaternary dimethylethanolamine functionality on a styrene-divinylbenzene matrix. Water initially displaced from the column was discarded. Over a period of about 6 hours, 1682 grams of improved polydextrose solution was collected.

By HPLC analysis of the solution using HPLC Method B, the improved polydextrose contained 0.047 wt % total citric acid. The hedonic score, determined for the solution by Test Method II, was 6.5. A control solution containing the same concentration of the unimproved starting material had a hedonic score of 4.0.

EXAMPLE 5

Improved Polydextrose By Treatment With A Weakly Basic Amine Resin Followed By A Quaternary Dimethylethanolamine Resin A bulk lot of polydextrose, prepared as described in Example 1, was dissolved in water to make 1472 grams of a 60 % w/w solution. This solution was passed through a freshly-prepared column of 150 cubic centimeters of Rohm and Haas Amberlite IRA 93 anion exchange resin at about 48°–50° C. and a flow rate of about 1.4 bed volumes per hour. IRA 93® is a macroreticular resin containing tertiary amine functionality on a styrene-divinylbenzene matrix. Water initially displaced from the column was discarded. Over a period of 5.75 hours, 1402 grams of improved polydextrose solution was collected.

The effluent was diluted with water to make a 57 % w/w solution. A 1082-gram portion of this solution was passed through a freshly-prepared column of 100 cubic centimeters of Dowex 22 anion exchange resin at about 34°–36C. and a flow rate of about 1.4 bed volumes per hour. Dowex 22® is a macroreticular resin containing quaternary dimethylethanolamine functionality on a styrene-divinylbenzene matrix. Water initially displaced from the column was discarded. Over a period of about 6 hours, 983.5 grams of improved polydextrose solution was collected.

By HPLC analysis of the solution using HPLC Method B, the improved polydextrose contained 0.002 wt % total citric acid. The hedonic score, determined for the solution by Test Method II, was 7.0. A control solution containing the same concentration of the unimproved starting material had a hedonic score of 4.0.

EXAMPLE 6

Improved Polydextrose By Treatment With A Weakly Basic Amine Resin Followed By A Mixed Bed Resin A bulk lot of polydextrose, prepared as described in Example 1, was dissolved in water to make 950.0 pounds of a 55 % w/w solution. This solution was passed through two freshly-prepared columns of 0.7 cubic feet each of Rohm and Haas Amberlite IRA 93® anion exchange resin at about 25°–28° C. and a flow rate of about 1.6 bed volumes per bed volume per hour. IRA 93® is a macroreticular resin containing tertiary amine functionality on a styrene-divinylbenzene matrix. Water initially displaced from the column was recycled for later make-ups. Over a period of about 11 hours, 890.0 pounds of improved polydextrose solution was collected.

The resin was regenerated with a 4% sodium hydroxide solution at 35°–38° C., at a level of 6.0 pounds of dry sodium hydroxide per cubic foot of resin, then rinsed by the manufacturer's recommended procedure. Additional polydextrose was then processed through the column.

The partially improved polydextrose was recovered by evaporating the water in a thin film evaporator and solidifying the melt in trays.

A portion of the resulting solid was dissolved in water to make 470.0 pounds of 55 % w/w solution. This solution was passed at about 37°–38° C. and a flow rate of about 0.6 bed volumes per hour through a freshly-prepared column of 0.39 cubic feet of Dowex 22 anion exchange resin intimately mixed with 0.20 cubic feet of Amberlite 200 cation exchange resin. Dowex 22® is a macroreticular resin containing quaternary dimethyl-ethanolamine functionality on a styrene-divinylbenzene matrix, whereas Amberlite 200 is a macroreticular resin containing sulfonic acid functionality on a styrene-divinylbenzene matrix. Water initially displaced from the column was discarded. Over a period of about 17 hours, 425.0 pounds of improved polydextrose solution was collected.

The column was regenerated by first separating the resins, then passing a 4% sodium hydroxide solution at 35°–38° C. through the column from the top at a level of 15.0 pounds of dry sodium hydroxide per cubic foot of anion exchange resin, followed by a water rinse by the manufacturer's recommended procedure. This leaves the anion exchange resin in the hydroxide form and the cation exchange resin in the sodium form. Finally, the cation exchange resin was regenerated by passing acid through a distributor located at the top of the cation exchange resin, followed by a water rinse by the manufacturer's recommended procedure. The regenerant was 5% sulfuric acid at a level of 15.0 pounds of concentrated sulfuric acid per cubic foot of cation exchange resin.

Improved polydextrose was recovered by evaporating the water in a thin film evaporator and solidifying the melt on a cooling belt.

By HPLC analysis using HPLC Method B, the improved polydextrose contained 0.002 wt % total citric acid. The hedonic score, determined for a 50% aqueous solution by Test Method II, was 6.5. A control solution containing the same concentration of the unimproved starting material had a hedonic score of 4.0.

EXAMPLE 7

Improved Polydextrose By Treatment With A Weakly Basic Amine Resin Followed By A Mixed Bed Resin A bulk lot of polydextrose, prepared as described in Example 1, was dissolved in water to make 3420 pounds of a 55 wt % solution. This solution was passed through a freshly-prepared column of 9.0 cubic feet of Rohm and Haas Amberlite IRA 93® anion exchange resin at about 28°–30° C. and a flow rate of about 1.1 bed volumes per hour. IRA 93® is a macroreticular resin containing tertiary amine functionality on a styrene-divinylbenzene matrix. Water initially displaced from the column was recycled for later make-ups. Over a period of 3–4 hours, 2565 pounds of improved polydextrose solution was collected. To make recovery nearly quantitative, residual polydextrose was flushed from the column with about two bed volumes of water. The resulting dilute solution was used in make-up of the next batch of 55 wt % solution.

The resin was regenerated with a 4% potassium hydroxide solution at 35°–38° C., at a level of 6.5 pounds of dry potassium hydroxide per cubic foot of resin, then rinsed by the manufacturer's recommended procedure. Additional polydextrose was then processed through the column.

The partially improved polydextrose was recovered by evaporating the water in a thin film evaporator and solidifying the melt on a cooling belt.

A portion of the resulting solid was dissolved in water to make 900.0 pounds of 55 % w/w solution. This solution was passed at about 37°–38° C. and a flow rate of about 0.8 bed volumes per hour through a freshly-prepared column of 0.39 cubic feet of Dowex 22® anion exchange resin intimately mixed with 0.20 cubic feet of Amberlite 200 cation exchange resin. Dowex 22® is a macroreticular resin containing quaternary dimethylethanolamine functionality on a styrene-divinylbenzene matrix, whereas Amberlite 200 is a macroreticular resin containing sulfonic acid functionality on a styrene-divinylbenzene matrix. Water initially displaced from the column was discarded. Over a period of about 25.5 hours, 815.0 pounds of improved polydextrose solution was collected.

The column was regenerated by first separating the resins, then passing a 4% sodium hydroxide solution at 35°–38° C. through the column from the top at a level of 15.0 pounds of dry sodium hydroxide per cubic foot of anion exchange resin, followed by a water rinse by the manufacturer's recommended procedure. This leaves the anion exchange resin in the hydroxide form and the cation exchange resin in the sodium form. Finally, the cation exchange resin was regenerated by passing acid through a distributor located at the top of the cation exchange resin, followed by a water rinse by the manufacturer's recommended procedure. The regenerant was 5% sulfuric acid at a level of 15.0 pounds of concentrated sulfuric acid per cubic foot of cation exchange resin.

Improved polydextrose was recovered by evaporating the water in a thin film evaporator and solidifying the melt on a cooling belt.

By HPLC analysis using HPLC Method B, the improved polydextrose contained 0.007 wt % total citric acid. The hedonic score, determined for a 50% aqueous solution by Test Method II, was 6.5. A control solution containing the same concentration of unimproved polydextrose had a hedonic score of 4.0.

EXAMPLE 8

Improved Polydextrose By Treatment With A Mixed Bed Resin At Low Flow Rate

A bulk lot of polydextrose, prepared as described in Example 1, was dissolved in water to make 20.0 pounds of a 55 % w/w solution. This solution was passed at about 30°–40° C. and a flow rate of about 0.05 bed volumes per hour through a freshly-prepared column of 0.098 cubic feet of Dowex 22® anion exchange resin intimately mixed with 0.0.49 cubic feet of Amberlite 200 cation exchange resin. Dowex 22 is a macroreticular resin containing quaternary dimethylethanolamine functionality on a styrene-divinylbenzene matrix, whereas Amberlite 200 is a macroreticular resin containing sulfonic acid functionality on a styrene-divinylbenzene matrix. Water initially displaced from the column was discarded. Over a period of about 19.5 hours, 9.1 pounds of improved polydextrose solution was collected.

By HPLC analysis of the solution using HPLC Method B, the improved polydextrose contained less than 0.002 wt % total citric acid. The hedonic score, determined for the solution by Test Method II, was 7.5. A control solution containing the same concentration of unimproved polydextrose had a hedonic score of 4.0.

EXAMPLE 9

Improved Polydextrose By Treatment With A Mixed Bed Resin At Intermediate Flow Rate A bulk lot of polydextrose, prepared as described in Example 1, was dissolved in water to make 1150 grams of a 55 % w/w solution. This solution was passed at about 35°–37° C. and a flow rate of about 0.8 bed volumes per hour through a freshly-prepared column of 100 cubic centimeters of Dowex 22® anion exchange resin intimately mixed with 50 cubic centimeters of Amberlite 200 cation exchange resin. Dowex 22® is a macrorecticular resin containing quaternary dimethylethanolamine amine functionality on a styrene-divinylbenzene matrix, whereas Amberlite 200 is a macroreticular resin containing sulfonic acid functionality on a styrene-divinylbenzene matrix. Water initially displaced from the column was discarded. Over a period of about 8 hours, 1121 grams of improved polydextrose solution was collected.

By HPLC analysis of the solution using HPLC Method B, the improved polydextrose contained 0.020 wt % total citric acid. The hedonic score, determined for the solution by Test Method II, was 6.5. A control solution containing the same concentration of the unimproved starting material had a hedonic score of 4.0.

EXAMPLE 10

Improved Polydextrose By Treatment With A Mixed Bed Resin At Intermediate Flow Rate A bulk lot a polydextrose, prepared as described in Example 1, was dissolved in water to make 1753 grams of a 40 wt % solution. This solution was passed at about 25° C. and a flow rate of about 1.5 bed volumes per hour through a freshly-prepared column of 100 cubic centimeters of Dowex 22® anion exchange resin intimately mixed with 50 cubic centimeters of Amberlite 200 cation exchange resin. Dowex 22® is a macrorecticular resin containing quaternary dimethylethanolamine amine functionality on a styrene-divinylbenzene matrix, whereas Amberlite 200 is a macroreticular resin containing sulfonic acid functionality on a styrene-divinylbenzene matrix. Water initially displaced from the column was discarded. Over a period of about 6.5 hours, 1624 grams of improved polydextrose solution was collected.

By HPLC analysis of the solution using HPLC Method B, the purified polydextrose contained 0.043 wt % total citric acid. The hedonic score, determined for the solution by Test Method II, was 6.5. A control solution containing the same concentration of the unimproved starting material had a hedonic score of 4.0.

EXAMPLE 11

Polydextrose Treatment With A Type I Strongly Basic Quaternary Trimethylamine Resin A bulk lot of polydextrose, prepared as described in Example 1, was dissolved in water to make 89 pounds of a 60 % w/w solution. This solution, held at an average temperature of approximately 53° C., was passed through a freshly-prepared column of 0.02 cubic feet of Rohm and Haas Amberlite IRA 900 anion exchange resin at a flow rate of about 2.6 bed volumes per hour. IRA 900 is a macroreticular resin containing quaternary trimethylamine functionality on a styrene-divinylbenzene matrix. Water initially displaced from the column was discarded. Over a period of about 20 hours, 77 pounds of polydextrose solution was collected.

Organoleptic testing of samples taken at points approximately 10% and 20% through the run, at operating temperatures of 56° C. and 52° C., respectively, gave hedonic scores, determined for the solution by Test Method II, of 4.0 and 4.5, respectively.

EXAMPLE 12

Polydextrose Treatment With A Type I Strongly Basic Quaternary Trimethylamine Resin At Intermediate Flow Rate And 55° C.

A bulk lot of polydextrose, prepared as described in Example 1, was dissolved in water to make 1007 grams of a 60 wt % solution. This solution was passed through a freshly-prepared column of 75.0 cubic centimeters of Rohm and Haas Amberlite IRA 900 anion exchange resin at about 55° C. and a flow rate of about 1.9 bed volumes per hour. Water initially displaced from the column was discarded. Over a period of about 4.75 hours, 797 grams of polydextrose solution was collected.

By HPLC analysis of the solution using HPLC Method B, the polydextrose product contained 0.19 wt % total citric acid. Organoleptic testing by Test Method II of three samples taken at equal intervals throughout the run gave hedonic scores of 4.0, 5.0 and 4.0, respectively. A control solution containing the same concentration of unimproved polydextrose had a hedonic score of 4.0.

EXAMPLE 13

Polydextrose Treatment With A Type I Strongly Basic Quaternary Trimethylamine Resin At Intermediate Flow Rate and 40° C.

A bulk lot of polydextrose, prepared as described in Example 1, was dissolved in water to make 850 grams of a 50 wt % solution. This solution was passed through a freshly-prepared column of 75.0 cubic centimeters of Rohm and Haas Amberlite IRA 900 anion exchange resin at about 40° C. and a flow rate of about 2.0 bed volumes per hour. Water initially displaced from the column was discarded. Over a period of about 4.5 hours, 757 grams of purified polydextrose solution was collected.

By HPLC analysis of the solution using HPLC Method B, the improved polydextrose contained 0.028 wt % total citric acid. The hedonic score, determined for the solution by Test Method II, was 6.5. A control solution containing the same concentration of unimproved polydextrose had a hedonic score of 4.0.

EXAMPLE 14

Polydextrose Treatment With A Type I Strongly Basic Quaternary Trimethylamine Resin At High Flow Rate and 60° C.

A bulk lot of polydextrose, prepared as described in Example 1, was dissolved in water to make 870 grams of a 50 wt % solution. This solution was passed through a freshly-prepared column of 75.0 cubic centimeters of Rohm and Haas Amberlite IRA 900 anion exchange resin at about 60° C. and a flow rate of about 6.8 bed volumes per hour. Water initially displaced from the column was discarded. Over a period of about 1.5 hours, 842 grams of polydextrose solution was collected.

By HPLC analysis of the solution using HPLC Method B, the polydextrose product contained 0.14 wt % total citric acid. The hedonic score, determined for the solution by Test Method II, was 4.5. A control solution containing the same concentration of unimproved polydextrose had a hedonic score of 4.0.

EXAMPLE 15

Polydextrose Treatment With A Type I Strongly Basic Quaternary Trimethylamine Resin At Low Flow Rate And 40° C.

A bulk lot of polydextrose, prepared as described in Example 1, was dissolved in water to make 750 grams of a 60 wt % solution. This solution was passed through a freshly-prepared column of 75.0 cubic centimeters of Rohm and Haas Amberlite IRA 900 anion exchange resin at about 40° C. and a flow rate of about 0.5 bed volumes per hour. Water initially displaced from the column was discarded. Over a period of about 16.4 hours, 709 grams of purified polydextrose solution was collected.

By HPLC analysis of the solution using HPLC Method B, the polydextrose product contained 0.13 wt % total citric acid. The hedonic score, determined for the solution by Test Method II, was 4.0. A control solution containing the same concentration of unimproved polydextrose had a hedonic score of 4.0.

EXAMPLE 16

Polydextrose Treatment With A Type I Strongly Basic Quaternary Trimethylamine Resin At High Flow Rate and 50° C.

A bulk lot of polydextrose, prepared as described in Example 1, was dissolved in water to make 1156 grams of a 40 wt % solution. This solution was passed through a freshly-prepared column of 75.0 cubic centimeters of Rohm and Haas Amberlite IRA 900 anion exchange resin at about 50° C and a flow rate of about 6.8 bed volumes per hour. Water initially displaced from the column was discarded. Over a period of about 1.9 hours, 1067 grams of purified polydextrose solution was collected.

By HPLC analysis of the solution using HPLC Method B, the polydextrose product contained 0.09 wt % total citric acid. The hedonic score, determined for the solution by Test Method II, was 5.0. A control solution containing the same concentration of unimproved polydextrose had a hedonic score of 4.0.

EXAMPLE 17

Polydextrose Treatment With A Type I Strongly Basic Quaternary Trimethylamine Resin At High Flow Rate and 50° C.

A bulk lot of polydextrose, prepared as described in Example 1, was dissolved in water to make 1156 grams of a 40 wt % solution. This solution was passed through a freshly-prepared column of 75.0 cubic centimeters of Rohm and Haas Amberlite IRA 900 anion exchange resin at about 50° C. and a flow rate of about 10.1 bed volumes per hour. Water initially displaced from the column was discarded. Over a period of about 1.3 hours, 1080 grams of purified polydextrose solution was collected.

By HPLC analysis of the solution using HPLC Method B, the polydextrose product contained 0.17 wt % total citric acid. The hedonic score, determined for the solution by Test Method II, was 6.0. A control solution containing the same concentration of unimproved polydextrose had a hedonic score of 4.0.

EXAMPLE 18

Polydextrose Treatment With A Type I Strongly Basic Quaternary Trimethylamine Resin At Low Flow Rate and 25° C.

A bulk lot of polydextrose, prepared as described in Example 1, was dissolved in water to make 925 grams of a 50 wt % solution. This solution was passed through a freshly-prepared column of 75.0 cubic centimeters of Rohm and Haas Amberlite IRA 900 anion exchange resin at about 25° C. and a flow rate of about 0.5 bed volumes per hour. Water initially displaced from the column was discarded. Over a period of about 20 hours, 895 grams of purified polydextrose solution was collected.

By HPLC analysis of the solution using HPLC Method B, the polydextrose product contained 0.06 wt % total citric acid. The hedonic score, determined for the solution by Test Method II, was 6.5. A control solution containing the same concentration of unimproved polydextrose had a hedonic score of 4.0.

EXAMPLE 19

Comparison Of Hard Candies Made With Improved And Unimproved Polydextrose

Two hard candies A and B were made using the following ingredients and procedure.

| Ingredients | Weight % |
| --- | --- |
| Polydextrose 50% solution in water | 49.41 |
| Lycasin 50% solution in water | 49.41 |
| Citric acid | 0.80 |
| FD&C yellow #6, 10% solution in water | 0.06 |
| Orange Flavor N & ATP #5615[(1)] | 0.09 |
| Alitame 10% triturate in | 0.23 |
| mannitol (sweetener) | |
| Total | 100.00 |

[(1)]Givaudan Corp.

Procedure

The lycasin and polydextrose solutions were combined, and, with stirring, cooked to 157°–160° C. in an oil bath set at 180° C. The mixture was removed from the oil bath and cooled to 140° C. The citric acid, flavor, color and alitame triturate were added with thorough stirring. The resulting hot mass was transferred to a lightly oiled marble slab, cooled to about 80° C., and stamped using conventional laboratory hard candy equipment.

Hard candy A was made using unimproved polydextrose having a hedonic value, determined by Test Method I, of 5.4 and prepared by the method of Example 1. Hard candy B was made using the improved polydextrose of Example 2, prepared from the same unimproved polydextrose.

Product Evaluation

Hard candies A and B were similar in texture and color. However, when presented to panelists for side by side comparison of taste acceptability, candy B was rated superior in taste quality to candy A. The hedonic score for A was 5.1 and for B was 7.7.

EXAMPLE 20

Comparison Of Frozen Deserts Made With Improved And Unimproved Polydextrose

Two frozen deserts A and B were prepared using the following ingredients and methods.

| Ingredients | Weight % |
| --- | --- |
| Cream (36% butterfat) | 20.83 |
| Non-fat dry milk | 11.92 |
| Water | 38.19 |
| Polydextrose 70% solution in water, pH adjusted to 5.5 with NaHCO$_3$ | 25.00 |
| Gelatin, 125 Bloom | 0.50 |
| Avicel RC 591[1] | 1.00 |
| Drewmulse 700 E (emulsifier)[2] | 0.30 |
| Vanilla extract | 1.50 |
| Alitame 1% solution in water (sweetener) | 0.76 |
| Total | 100.00 |

[1]FMC Corporation, American Viscose Division
[2]PVO International Inc.

Procedure

All of the ingredients except vanilla extract and alitame solution were combined and pasteurized by rapidly heating to 71° C. and maintaining that temperature for 30 minutes. The mixture was then homogenized at 2500 psi in the first stage and at 500 psi in the second stage of a laboratory homogenizer. The mixture was rapidly cooled to 4° C., the alitame solution and vanilla extract added, and, after mixing thoroughly, stored in the refrigerator overnight. Finally, the mixture was frozen in an ice cream freezer at 90 to 100% overrun, then transferred into cups and stored in a freezer at −25° F. for at least two days before evaluation.

Frozen deserts A and B were prepared from unimproved and improved polydextrose, respectively, as in the preceding Example.

Product Evaluation

Frozen deserts A and B exhibited comparable color and texture. However, in side by side hedonic testing, the taste quality of frozen dessert B was determined to be superior to that of frozen dessert A. The hedonic score for A was 5.8, and for B was 7.1.

EXAMPLE 21

Comparison Of Pound Cakes Made With Improved And Unimproved Polydextrose

Two sugarless and fat-free pound-cakes A and B were baked using the following ingredients and method.

| Ingredients | Weight % |
| --- | --- |
| Part I: | |
| Polydextrose | 25.76 |
| N-Flate (shortening replacement)[1] | 4.10 |
| Part II: | |
| Sodium bicarbonate | 0.70 |
| Artificial Vanilla Flavor PFW 6100720[2] | 0.08 |
| Cake flour | 21.60* |
| Solka Floc B-200 (Cellulose)[3] | 2.00 |
| Glucono-delta-lactone | 1.30 |
| Part III: | |
| Salt | 0.34 |
| Xanthan gum - Keltrol F1[4] | 0.10 |
| Whole eggs | 21.75 |
| Water | 8.90 |
| Part IV: | |
| Artificial Butter Concentrate B[5] | 0.17 |
| Alitame 1% solution in water (sweetener) | 1.50 |
| Water | 11.50 |
| Total | 100.00 |

[1]National Starch Co.
[2]Hercules Inc. Food and Flavor Ingredient Group
[3]James River Corp.
[4]Kelco Co.
[5]Consumer Flavoring Extract Co.
*In cake B, cake flour was reduced by 0.25 weight %, and 0.25 weight % of citric acid added to Part I ingredients.

Procedure (The formulation was scaled to 300 grams)

1. Premix Part I was premixed in a 1½ quart mixing bowl with a Sunbeam Mixmaster.
2. Part II ingredients were added slowly and mixed in with double paddle to produce a uniform dry mix.
3. Part III ingredients were premixed in a separate container, then added to the above dry mixed ingredients. Mixing, while scraping down the sides of the bowl, was continued until the mixture was smooth.
4. Part IV ingredients were then added, and the batter mixed in until smooth and uniform.
5. A portion of the mixture (230 grams) was weighed and baked at 350° F. for 25 minutes in a lightly greased 4" by 6" loaf pan.

Cakes A and B were made with the unimproved and improved polydextrose, respectively, as in Example 4.

Product Evaluation

The two cakes were similar in color, volume, crumb and crust structure. However, they differed organoleptically in side by side hedonic testing. Sensory panel test results indicated that the majority of panelists (78%) preferred the taste of Cake B over Cake A, with hedonic scores of 6.75 and 5.75, respectively.

EXAMPLE 22

Comparison Of Cookies Made With Improved And Unimproved Polydextrose

Two batches of sugarless butter cookies A and B were baked using the following ingredients and procedure.

| Ingredients | Weight % |
| --- | --- |
| Part I: | |
| Polydextrose | 25.00 |
| Mannitol | 10.00 |
| Part II: | |
| Salt | 0.11 |
| Butter | 12.18 |
| Whole eggs | 10.15 |
| Vanilla Extract | 0.81 |
| Artificial Butter Flavor Concentrate B[1] | 0.10 |
| Part III: | |
| Water | 1.00 |
| Alitame 1% solution in water (sweetener) | 1.60 |
| Sodium Bicarbonate | 0.15 |

-continued

| Ingredients | Weight % |
| --- | --- |
| Part IV: | |
| Glucono-delta-lactone | 0.26 |
| All purpose flour | 35.64 |
| Starch H-50[2] | 2.00 |
| Flour substitute blend[3] | 1.00 |
| Total | 100.00 |

[1] Consumer Flavoring Extract Co.
[2] National Starch Co.
[3] Blend comprised of: 1.02% Xanthan gum, 5.10% lecithin powder and 93.88% Solka-Floc BW 200 (by weight)

Procedure

1. The ingredients at Part I were creamed at #2 speed in a Sunbeam Mixmaster for about 1 minute, and at #4 speed for 3 minutes.
2. The ingredients of Part II were added and mixed in at #2 speed for 45 seconds.
3. The ingredients of Part III were added and mixed in at #4 speed for 35 seconds.
4. The premixed ingredients of Part IV were added and mixed in at #4 speed for 30 seconds.
5. A cookie gun was filled with the mixture and cookies formed into desired shape on a slightly greased cookie sheet, then baked at 375° F. for 8 minutes (or until light golden, being careful not to overbake), and the hot cookies transferred to a cooling rack.

Cookie batches A and B were made with the unimproved and improved polydextrose, respectively, as in Example 4.

Product Evaluation

The two cookie batches exhibited comparable color, crust and crumb structure. When presented side by side to a panel of tasters, the majority of judges (71%) found the cookies of batch B had a more favorable taste quality than the cookies of batch A. The hedonic score for batch B was 6.9, while that for batch A was 5.3.

What is claimed is:

1. A process for preparing an improved water-soluble highly-branched polydextrose containing 0.3 mol percent or less of citric acid bound in the form of ester groups which comprises reducing the mol percent of citric acid bound in the form of ester groups of unimproved highly-branched polydextrose in order to reduce the bitterness thereof, which unimproved highly-branched polydextrose has been prepared by a process which comprises melting dextrose at a temperature below its decomposition point in the presence of 0.5 to 3.0 mol percent of citric acid, said process of reducing the mol percent of citric acid bound in the form of ester groups comprises passing an aqueous solution of the unimproved highly-branched polydextrose through one or more resins selected from the group consisting of an adsorbent resin, a weakly basic ion exchange resin, a Type I strongly basic ion exchange resin, a Type II strongly basic ion exchange resin and a mixed bed resin comprising a basic ion exchange resin and a cation exchange resin.

2. A process according to claim 1 wherein both the unimproved and improved polydextrose contain about 5–15% by weight of sorbitol residues.

3. A process according to claim 2 wherein both the unimproved and improved polydextrose contain about 8–12% by weight of sorbitol residues.

4. A process according to claim 1 wherein reducing the mol percent of citric acid bound in the form of ester groups comprises passing an aqueous solution of the unimproved highly-branched polydextrose through a weakly basic ion exchange resin.

5. A process according to claim 4 wherein the ion exchange resin comprises tertiary dimethylamine functionality.

6. The process as claimed in claim 4, further comprising passing the resulting polydextrose through a mixed bed resin.

7. The process as claimed in claim 6, wherein the mixed bed resin comprises type II strongly basic ion exchange resin.

8. A process according to claim 1 wherein reducing the mol percent of citric acid bound in the form of ester groups comprises passing an aqueous solution of the unimproved highly-branched polydextrose through an adsorbent resin.

9. A process according to claim 8 wherein the resin is a dimethylamine functionalized chloromethylated macroporous copolymer of styrene and divinylbenzene.

10. A process according to claim 1 wherein reducing the mol percent of citric acid bound in the form of ester groups comprises passing an aqueous solution of the unimproved highly-branched polydextrose through a Type I strongly basic ion exchange resin.

11. A process according to claim 10 wherein about 10 to about 70 wt % of an aqueous solution of the unimproved highly-bound polydextrose is passed through the Type I strongly basic ion exchange resin at a temperature of from about 10° to about 50° C. and a flow rate of from about 0.1 to about 12 bed volumes per hour.

12. A process according to claim 11 wherein the resin comprises quaternary trimethylamine functionality.

13. A process according to claim 1 wherein reducing the mol percent of citric acid bound in the form of ester groups comprises passing an aqueous solution of the unimproved highly-branched polydextrose through a Type II strongly basic ion exchange resin.

14. A process according to claim 13 wherein the resin comprises quaternary dimethylethanolamine functionality.

15. A process according to claim 1 wherein reducing the mol percent of citric acid bound in the form of ester groups comprises passing an aqueous solution of the unimproved highly-branched polydextrose through a mixed bed resin comprising a basic ion exchange resin and a cation exchange resin.

16. A process according to claim 15 wherein the basic ion exchange resin is a weakly basic ion exchange resin.

17. A process according to claim 16 wherein the weakly basic ion exchange resin comprises tertiary dimethylamine functionality.

18. A process according to claim 15 wherein the basic ion exchange resin is a Type I strongly basic ion exchange resin and about 10 to 70 wt % of an aqueous solution of the unimproved highly-branched polydextrose is passed through the mixed bed resin at a temperature of from about 10° to about 50° C. and a flow rate of from about 0.1 to about 12 bed volumes per hour.

19. A process according to claim 18 wherein the Type I strongly basic ion exchange resin comprises quaternary trimethylamine functionality.

20. A process according to claim 15 wherein the basic ion exchange resin is a Type II strongly basic ion exchange resin.

21. A process of claim 20 wherein the Type II strongly basic ion exchange resin comprises quaternary dimethylethanolamine functionality.

22. A process according to claim 1 which comprises the step of passing an aqueous solution of polydextrose through a cation exchange resin.

23. The process as claimed in claim 1, wherein said adsorbent resin has an amine functionality.

24. A method for the purification of polydextrose consisting essentially of:

a) dissolving polydextrose in water;

b) passing said solution through an ion exchange column; and c) collecting and concentrating the eluate produced thereby until a substantially functional product is recovered.

25. The method according to claim 24 wherein the concentration of polydextrose in solution ranges from approximately 10% to about 70%.

26. The method according to claim 25 wherein said ion exchange column consists of an anion exchange resin.

27. The method according to claim 25 wherein said ion exchange column consists of a mixed bed resin.

28. The method according to claim 26 wherein said polydextrose solution is passed through said ion exchange column at room temperature.

29. The method according to claim 24 wherein said polydextrose solution is passed through said ion exchange column at room temperature.

30. The method according to claim 24 wherein said polydextrose solution is passed through said ion exchange column more than once.

* * * * *

UNITED STATES PATENT AND TRADEMARK OFFICE
CERTIFICATE OF CORRECTION

PATENT NO. : 5,645,647
DATED : July 8, 1997
INVENTOR(S) : Guzek, et. al.

It is certified that error appears in the above-identified patent and that said Letters Patent is hereby corrected as shown below:

Item [73],

On the cover page, under Assignee, delete "Pfizer Inc., New York, N.Y." and insert --Cultor Ltd., Helsinki, Finland--.

Column 1, line 13, delete "6.001" and insert --0.001--.

Claim 29, line 1, delete "24" and insert --27--.

Signed and Sealed this

Tenth Day of March, 1998

Attest:

BRUCE LEHMAN

*Attesting Officer*     *Commissioner of Patents and Trademarks*